United States Patent
Zhou

(10) Patent No.: US 9,193,206 B2
(45) Date of Patent: Nov. 24, 2015

(54) FABRIC PRINT MEDIA

(75) Inventor: Xiaoqi Zhou, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/397,099

(22) PCT Filed: Apr. 26, 2012

(86) PCT No.: PCT/US2012/035214
§ 371 (c)(1),
(2), (4) Date: Oct. 24, 2014

(87) PCT Pub. No.: WO2013/162578
PCT Pub. Date: Oct. 31, 2013

(65) Prior Publication Data
US 2015/0110976 A1    Apr. 23, 2015

(51) Int. Cl.
| | |
|---|---|
| *B41M 5/00* | (2006.01) |
| *B41M 5/50* | (2006.01) |
| *B41M 5/52* | (2006.01) |
| *B41M 1/26* | (2006.01) |
| *D06P 5/20* | (2006.01) |
| *D06P 1/50* | (2006.01) |
| *D06P 1/667* | (2006.01) |
| *D06P 1/673* | (2006.01) |
| *C09D 103/02* | (2006.01) |

(52) U.S. Cl.
CPC . *B41M 5/50* (2013.01); *B41M 1/26* (2013.01); *B41M 5/508* (2013.01); *B41M 5/5245* (2013.01); *C09D 103/02* (2013.01); *D06P 1/50* (2013.01); *D06P 1/667* (2013.01); *D06P 1/673* (2013.01); *D06P 5/2044* (2013.01); *D06P 5/2061* (2013.01)

(58) Field of Classification Search
CPC ...... B41M 5/508; B41M 5/5245; C04B 20/10
See application file for complete search history.

(56) References Cited

U.S. PATENT DOCUMENTS

| | | | |
|---|---|---|---|
| 6,001,137 A | 12/1999 | Alfekri et al. | |
| 6,326,323 B1 | 12/2001 | Shimano et al. | |
| 6,478,980 B2 | 11/2002 | Nigam | |
| 6,838,132 B1 | 1/2005 | Iguchi et al. | |
| 6,863,933 B2 | 3/2005 | Cramer et al. | |
| 2003/0157303 A1 | 8/2003 | Li et al. | |
| 2005/0245156 A1 | 11/2005 | Cates et al. | |
| 2006/0088675 A1 | 4/2006 | Hladik et al. | |
| 2006/0228499 A1 | 10/2006 | Tran et al. | |
| 2006/0281849 A1 | 12/2006 | Johnson | |
| 2008/0081160 A1* | 4/2008 | Anderle et al. ............ | 428/195.1 |
| 2008/0127431 A1 | 6/2008 | Harz et al. | |
| 2009/0258182 A1 | 10/2009 | Okamoto et al. | |
| 2011/0102497 A1 | 5/2011 | Sato et al. | |
| 2011/0169901 A1* | 7/2011 | Pinto et al. ................... | 347/101 |

FOREIGN PATENT DOCUMENTS

| | | | |
|---|---|---|---|
| CN | 1593917 | 3/2005 | |
| CN | 101022957 | 8/2007 | |
| CN | 102245719 | 11/2011 | |
| EP | 1448827 | 9/2007 | |
| JP | 2002-108499 | * 4/2000 | ............... B41M 5/00 |
| JP | 2002321452 | 11/2002 | |
| WO | WO-2006047031 | 5/2006 | |
| WO | WO 2011014199 A1 | 2/2011 | |

OTHER PUBLICATIONS

International Search Report and Written Opinion dated Dec. 27, 2012 for International application No. PCT/US2012/035214, Applicant Hewlett-Packard Development Company, L.P. et al.
CIPO, Chinese Application No. 201280072442,6. Office Action dated 20JL2015, 10 pages.

\* cited by examiner

*Primary Examiner* — Betelhem Shewareged
(74) *Attorney, Agent, or Firm* — Thorpe, North & Western L.L.P.

(57) ABSTRACT

The present disclosure is drawn to fabric print media, a coating composition, and a method of coating a fabric substrate to form a fabric print medium. The fabric print medium can comprise a fabric substrate having an ink-receiving coating applied thereto, the coating comprising a metal complex, an organophosphate, and a starch.

15 Claims, No Drawings

FABRIC PRINT MEDIA

BACKGROUND

Different forms of printing, such as inkjet printing, have found various applications on different substrates including traditional cellulose paper, metal, plastic, fabric, and the like. Regarding fabric specifically, challenges related to various printing technologies exist because of the nature of fabric. Some fabrics, for example, can be highly absorptive, diminishing color characteristics, while some synthetic fabrics can be crystalline, decreasing aqueous ink absorption leading to ink bleed. These characteristics result in the image quality on fabric being relatively low. Additionally, black optical density, color gamut, and sharpness are often poor compared to images printed on cellulose paper or other media types. As the moisture sensitivity of images printed on fabric is usually high, images are formed that have poor waterfastness and washability. Yet another problem associated with printing on fabric is related to a reduction in softness that is often associated with treated fabrics. Consumers usually prefer softer fabric properties while maintaining colorant adherence and image quality. Further, when fabric is intended to be worn, or used in close proximity to the body, there are also concerns about using coatings that increase the flammability of the fabric. Thus, fire retardant characteristics can also be desirable when providing printable fabrics.

Obtaining good print characteristics while retaining fabric softness and fire retardant characteristics can be challenging, and providing one or more of these features can provide an advancement in the art of printable fabric.

DETAILED DESCRIPTION

In accordance with this, compositions and associated methods described herein are directed generally towards coated fabric substrates for printing, as well as coating compositions used to coat fabrics for printing. Often, fabric does not accurately receive inks due to bleed, diminished color characteristics, etc. Additionally, as the moisture sensitivity of fabric leads to poor waterfastness and washability characteristics, fabric softness, etc., by coating fabrics with a formulation including a metal complex, an organophosphate, and a starch, it has been discovered that printing on fabric can be accurate and more permanent, and the resultant fabric can remain soft while often providing acceptable fire-retardant properties to the fabric. In one example, the metal complex may improve the print quality and optical density of the image, the organophosphate may provide flame retardancy and flexibility to provide a soft hand feeling of the fabric substrate, and the starch may act as a binder to the other ingredients while providing additional flame retardancy and ink fixation. Other combinations of benefits can also be achieved, depending on the specific components selected for use in combination with one another.

In accordance with this, the present disclosure is drawn toward a fabric print medium comprising a fabric substrate having an ink-receiving coating applied thereto. The coating can comprise a metal complex, an organophosphate, and a starch.

In another example, a coating composition can comprise water, 5 wt % to 50 wt % metal complex by solid weight content, 5 wt % to 50 wt % organophosphate by solid weight content, and 10 wt % to 80 wt % starch by solid weight content. The weight ratio of water to solids can be from 2:1 to 99:1 by weight, and in one example, the water to solids can be present at a weight ratio from 5:1 to 98:1. In one example, other volatile solvents in addition to water can optionally be included with the water to form a carrier fluid for application of the solids. This coating composition is particularly suitable for coating on a fabric substrate to form an ink-receiving layer thereon. When the coating composition is applied and water or other volatiles evaporate or are dried off, the remaining solids form the ink-receiving layer.

In another example, a method of coating a fabric substrate to form a fabric media substrate can comprise impregnating a fabric substrate with a coating composition comprising water, a metal complex, an organophosphate, and a starch. An additional step includes drying the fabric substrate, and optionally, padding the fabric substrate under pressure.

It is noted that when discussing the present fabric print media, coating compositions, and methods, each of these discussions can be considered applicable to each of these embodiments, whether or not they are explicitly discussed in the context of that embodiment. Thus, for example, in discussing coating composition, such as coating can also be used in the method or in preparing the fabric print medium, and vice versa.

Turning now to the individual components of the fabric print medium and related coatings and methods of the present disclosure, detailed discussion of the metal complex, the organophosphate, the starch, and optional ingredients are provide below. Furthermore, specific discussion of the fabric substrate is also provided as it relates to the fabric media substrate and related methods.

Regarding the fabric substrate, any textile, fabric material, fabric clothing, or other fabric product where there is a desire for application of printed matter can benefit from the principles described herein. More specifically, fabric substrates useful in present disclosure include substrates that have fibers that may be natural and/or synthetic. Examples of fabrics with natural fibers include those with fibers of wool, cotton, silk, rayon, and/or thermoplastic aliphatic polymers derived from renewable resources such as corn starch, tapioca products, or sugarcanes like poly(lactic acid) or polylactide (PLA). Examples of fabrics with synthetic fibers include those with fibers of polyesters, polyamides, polyimides, polypropelene, polyethylene, polystyrene, Polytetrafluoroethylene (TEFLON®), fiberglass, polytrimethylene, polycarbonates, polyester terephthalate, or polybutylene terephthalate. Mixtures and combinations of such natural and/or synthetic fibers can be also used. Any construction of these natural or synthetic fibers can also be used as the fabric substrate, such as materials constructed that are woven, knitted, non-woven, tufted, or the like. Woven textiles can include, but are not limited to, satin, poplin, and crepe weave textiles. Knitted textiles can include, but are not limited to, circular knit, warp knit, and warp knit with a microdenier face. Furthermore, the fabric substrates of the present disclosure can be flat, or may exhibit a pile. It is notable that the term "fabric substrate" does not include materials commonly known as paper, even though paper can include fibers. Furthermore, fabric substrates include both textiles in their fiber form, in the form of fabric material, or even in the form of fabric that has been crafted into finished article (clothing, blankets, tablecloths, napkins, bedding material, curtains, carpet, shoes, etc.). In other words, surface modification coatings of the present disclosure can be prepared and applied to the fabric substrates of the present disclosure in any manner that enables application of the coating composition to the fabric substrate. Such application can be to finished textiles or fabric, or can be applied to textile fibers prior to preparation of the fabric from the textile fibers. As mentioned, the fabric substrate is coated with a coating or treatment composition that includes the metal complex, the organophosphate, and the starch, with or without some optional ingredients, depending on the specific application.

Turning specifically to the coating composition, as mentioned, the composition can comprise a metal complex, such as a charged complex ion derived from metal complexes with coordinate covalent bonds or dative bonds. The coordination number is defined by the number of ligand(s) attached to the central metal ion, and typically ranges from two to nine, or even more. In some examples, the ligands can be a small polar molecules, such as $H_2O$ and $NH_3$, and in some examples, the ligands can be anions such as $Cl^-$, $OH^-$ and $S^{2-}$. Often, the metal complex or charged complex ion with associated ligands is white in color or are colorless. Typical examples include $[Al(H_2O)_6]^{3+}$, $[Al(H_2O)_3(OH)_3]$, $[Al(H_2O)_3(OH)_3]$, and $[Al(H_2O)_3(OH)_3]$. Another specific example includes potassium aluminum sulfate dodecahydrate. Alternatively, the metal complex can include two or more central atoms, also referred to as polynuclear complexes, which can be formed when a ligand donates electron pairs to two or more metal ions simultaneously and then acts as bridge between the multiple central ions. For example, in some examples, the charged complex ions can be octa-aquo-dioxodialuminim $(iV)^{4+}$, $Al_8(OH)_{20}^{4+}$, and $[Al_8(OH)_{10}(SO4)_5]^{4+}$. Other types of multivalent salts without similar complex structure as described above may also be used to similar positive effect. For example, aluminum fluorosulfate and aluminum chloride can also provide acceptable printing characteristics. The inclusion of one of these salts or other similar salt can improve the print quality and optical density in ink when printed on fabrics.

The metal complex can be present, by solids, in the coating composition or on the fabric substrate at from 5 wt % to 50 wt %, or from 10 wt % to 40 wt %, though these ranges are only exemplary and are not intended to be limiting.

The coating compositions of the present disclosure may also include an organophosphate. The organophosphate can be an organophosphonate with four oxygen atoms attached to the central phosphorus; an aliphatic, aromatic, or polymeric organophosphate with 3 oxygen atoms attached to the central phosphorus, or an organophosphinate with 2 oxygen atoms attached to the central phosphorus atom. Formula II below provides a general formula for an organophosphonate, Formula III sets forth an organophosphate that can be aliphatic organophosphate, an aromatic organophosphate, or an organophosphate polymer; and Formula IV provides a formulaic example of organophosphinates. Thus, the organophosphates used in accordance with examples of the present disclosure can have general Formula II-IV, as follows:

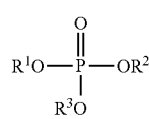

Formula II

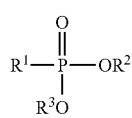

Formula III

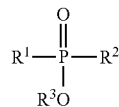

Formula IV where $R^1$, $R^2$, and $R^3$ are individually organic or inorganic substituents that can be different or the same, including $C_1$-$C_{12}$ branched or straight chained alkyl, aryl, bisphosphate, or halogen (such as chlorinated or fluorinated substituents). Examples of organophosphates include tris(1,3-dichloroisopropyl)phosphate, tris (2-chloroisopropyl)phosphate, tris(2-chloroisopropyl)phosphate, dimethyl phosphonate, diethyl phosphonate, dimethyl propyl phosphonate, diethyl N,N-bis (2-hydroxyethyl) aminomethyl phosphonate, oligomeric chloroalkyl phosphates, chloroalkyl phosphates, aryl phosphates, or the like.

The organophosphate can be present, by solids, in the coating composition or on the fabric substrate at from 5 wt % to 50 wt %, or from 10 wt % to 40 wt %, though these ranges are only exemplary and are not intended to be limiting.

It is also notable that all these organophosphates can be used alone or in combination with one another, or further, in combination with phosphor containing esters to provide desired coating characteristics such as viscosity or improved characteristics of the finished product, including enhanced flame retardancy, flexibility, or softness of the fabric substrate.

A third component that can be present in the coating compositions of the present disclosure include starches from various natural sources, including one or more starch compound selected from corn starch, potato starch, rice starch, maize starch, cassava starch, or wheat starch. In other examples, the starch can be a cationic starch which can provide improvements in image quality as well as provide acceptable binding properties for the other coating composition components. More specifically, the cationic starch can bind with the organophosphate, and has the added benefit of being a fire retardant. Examples of cationic starches that can be used include copolymers of saccharides. In certain specific examples, the positive charge center of the cationic starch can be formed by reacting quaternary salts, such as 2,3-epoxy propyl trimethyl ammoniumchloride and/or (3-chloro-2-hydroxypropyl) trimethyl ammonium chloride, with saccharides, e.g., where quaternary ammonium cations are grafted onto polysaccharide chain. Thus, the polysaccharide, in coordination with the organophosphate, can provide enhanced capability to enhance fire retardancy. Furthermore, the cationic center not only provides compatibility with the organophosphate, but also can provide chemical bonding to anionic charged ink pigment particles, if the printing system used includes inks with such pigments. Such an attraction can provide printing advantages, e.g., improvement in water fastness, optical density, color gamut, bleed control, etc.

The starch can be present, by solids, in the coating composition or on the fabric substrate at from 10 wt % to 80 wt %, or from 30 wt % to 75 wt %, though these ranges are only exemplary and are not intended to be limiting.

In further detail regarding the starch, it is notable that the number of cationic groups, such as quaternary ammonium cations, can be characterized by the degree of copolymerization, and can typically be from 5 to 20 per 100 saccharide repeating units, though this range is not intended to be limiting. This structure characteristic reflects the charge density of the compound, and can be evaluated or verified using Zeta-potential. In one example, the Zeta-potential can range from 20 to 65 mV.

It is notable that typically, the coating composition is prepared in a carrier that is used to disperse or solubilize coating composition components. The carrier can be removed, at least in part, from the final product once the coating is applied to the fabric, or can include compounds that remain as solids when a portion of the carrier is removed. The carrier typically includes one or more of water, cosolvents, surfactants, viscosity modifying agents, inorganic compounds, pH control agents, deformers, or the like. The primary function of the carrier is to dissolve and/or carry the solids or other components that are to remain on the fabric as a coating, and typically, provides a carrier that will suitably carry all the components in the composition and makes them uniformly distribute on the fabric surface. Furthermore, in some examples, upon drying, the coating composition as a whole can be formulated to be film-form or otherwise provide chemical and/or physical properties that remain at least partially on a top surface of fabric. There is no specific limitation on selection of the carrier components, as long as the carrier as a whole has the function described above.

In further detail regarding the carrier, components that provide added fire retardancy properties (or at least not adding to the flammability of the fabric) can also be desirable for use. Thus, liquid carrier compositions that do not generate char when exposed to fire, and/or which act to block the transfer of fire to the fabric can be considered as desirable carrier components. To provide one example, inorganic compounds such as sodium silicates can be used as part of the carrier. For example, the composition $SiO_2.Na_2O$ can be part of the carrier composition (along with water or other liquid components). In this example, the $Na_2O$ can be present in the carrier at from 5 wt % to 15 wt % (e.g., from 9 wt % to 11 wt %); the $SiO_2$ can be present in the liquid carrier from 20 wt % to 40 wt % (e.g., from 30 wt % to 32 wt %); and the balance can be water. This liquid carrier can be used to carry the metal complex, the organophosphate, and the starch to evenly distribute these components to the surface of a fabric or textile fiber. When mixing this liquid carrier, the sodium silicate can be included with the water as a liquid and it can be readily cure into solid film under drying conditions.

The application of the coating composition to the fabric substrate can be carried out using padding procedures generally known in the art. In one example, the fabric substrate can be soaked in a bath and the excess can be rolled out. More specifically, impregnated fabric substrates (prepared by bath, spraying, dipping, etc.) can be passed through padding nip rolls under pressure to provide a wet picked up from 40-60%, though this range is not limiting. The impregnated fabric after nip rolling can then be dried under heat at any functional drying temperature and drying time.

Once the coating composition is applied to the fabric substrate and appropriately dried, inkjet inks or other types of inks can be applied by any of a number of processes. In one example, latex inkjet printing technology is particularly useful for printing on the media described in the present disclosure. Thus, the ink composition can comprise a polymeric latex and a colorant. The polymeric latex refers herein to a stable dispersion of polymeric micro-particles dispersed in the aqueous vehicle of the ink. The polymeric latex can be natural latex or synthetic latex. Synthetic latexes are usually produced by emulsion polymerization using a variety of initiators, surfactants and monomers. In various examples, the polymeric latex can be a cationic, anionic, or amphoteric polymeric latex. Monomers that are often used to make synthetic latexes include ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; butyl acrylate; iso-butyl methacrylate; 2-ethylhexyl acrylate; 2-ethylhexyl methacrylate; isooctyl acrylate; and iso-octyl methacrylate.

In some examples, the latexes used are prepared by latex emulsion polymerization and have a weight average molecular weight ranging from about 10,000 Mw to about 5,000,000 Mw. In other examples, the polymeric latex can be selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers. In some examples, the polymeric latex liquid suspension contains a liquid (such as water and/or other liquids) and polymeric latex particulates having a size ranging from about 20 nm to about 500 nm. In some other examples, the polymeric latex particulates have a size ranging from about 100 nm to about 300 nm.

In further detail regarding the inkjet ink technology that is useful with the fabric print media described herein, inks that can be used include those comprising one or more colorant that imparts the desired color to the printed media. As used herein, "colorant" includes dyes, pigments, and/or other particulates that may be suspended or dissolved in an ink vehicle that imparts color to the ink composition. The colorant can be present in the ink composition in an amount to produce the desired contrast and readability. In some examples, the ink composition includes pigments as the colorant(s). Pigments that can be used include self-dispersed pigments as well as standard pigments that utilize as separate dispersing agent. With specific respect to inkjet printing, for example, the ink can be jetted onto the coated fabric where discrete polymer particles are laid down on the surface.

EXAMPLES

The following examples illustrate some embodiments of the fabric print media and methods that are presently known. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present recording media and methods have been described above with particularity, the following examples provide further detail in connection with what are presently deemed to be the acceptable embodiments.

Example 1

Preparation of Coated Fabric Substrates

Four fabric substrates were used to demonstrate properties of the fabric print media prepared in accordance with examples of the present disclosure. The characteristic of four separate fabrics are set forth in Table 1, as follows:

TABLE 1

Fabric Substrates

| Fabric Substrate | Construction | Basis weight | Weaving structure |
|---|---|---|---|
| F1 | 100% Woven Polyester | 120 gsm | Poplin |
| F2 | 100% Woven Recycled Polyester | 157 gsm | Poplin |
| F3 | 100% Woven Polyester | 271 gsm | Plain |
| F4 | 100% Cotton | 250 gsm | Plain |

Six coating compositions were prepared to coat on the Fabric Substrates of Table 1. The coating for each composition included a metal complex, an organophosphate, and a starch. Carriers and other processing aids were also included in these examples. The ingredients were admixed in a lab mixer in about 1 L batch sizes at room temperature according to the formulations summarized in Table 2:

TABLE 2

Sample Formulations of Coating Compositions

| Ingredients (wt %) | C1 | C2 | C3 | C4 | C5 | C6 |
|---|---|---|---|---|---|---|
| Aluminum sulfate Hydrate (metal complex) | 30.7% | 25.7% | 30.7% | 23.2% | 24.4% | 12.5% |
| Exolit PE 100 (organo-phosphate) | 15% | 28.4% | — | — | 15% | 15% |
| Aflammit PE Conc (organo-phosphate) | — | — | 15 wt % | 35 wt % | — | — |
| CLIN-CAT 831 (starch) | 51.3% | 42.9% | 51.3% | 38.8% | 57.6% | 69.5% |
| STIXSO K (sodium oxide carrier) | 2.6% | 2.6% | 2.6% | 2.6% | 2.6% | 2.6% |
| BYK dyne 800 (surfactant) | 0.3% | 0.3% | 0.3% | 0.3% | 0.3% | 0.3% |
| Foammaster (defoamer) | 0.1% | 0.1% | 0.1% | 0.1% | 0.1% | 0.1% |
|  | 100% | 100% | 100% | 100% | 100% | 100% |
| Total % of Ingredients other than water | 5% | 5% | 5% | 5% | 5% | 5% |
| Water | 95% | 95% | 95% | 95% | 95% | 95% |

TABLE 3

Fabric Print Media

| | Fabric Substrate | Coating Composition |
|---|---|---|
| Sample 1 | F1 | C1 |
| Sample 2 | F1 | C5 |
| Sample 3 | F1 | C6 |
| Sample 4 | F3 | C1 |
| Sample 5 | F3 | C2 |
| Sample 6 | F3 | C3 |
| Sample 7 | F3 | C4 |
| Sample 8 | F1 | C1 |
| Sample 9 | F2 | C2 |
| Sample 10 | F4 | C1 |
| Comparative Sample | F1 | None |

In processing and preparing the treated Fabric Print Media of Table 3, Fabric Substrates listed in Table 1 were separately impregnated with the Coating Composition solutions of Table 2. Once impregnated as described, the Fabric Substrates were passed through padding nip rolls with a nip pressure about 30 PSI to get a wet pick up between 40-60%. The processed Fabric Substrates were then dried in a convection oven at 200° F. to 280° F., depending on the substrate, with a drying speed of 2 feet per minute. The drying temperature for C3 and C4 was 410° F. for 1 minute.

Example 2

Image Quality and Durability Testing

Once the Fabric Print Media was prepared as described above in Example 1, an identical image sequence was printed on the Fabric Print Media (Samples 1-10) and the Comparative Sample using a HP DesignJet L25500 Printer equipped with HP 789 ink cartridges. The printer was set with a heating zone temperature at about 50° C., a cure zone temperature at about 110° C., and an air flow at about 15%. The following tests were carried out on these printed images:

Image quality—Image quality tests were conducted by measuring characteristics such as black optical density, color gamut, and ink bleed. The Black OD (KOD) and color gamut were measured on Macbeth® TD904 device (Macbeth Process measurement). The image quality of the prints related to bleed was evaluated visually from the printed samples using a scale of 1-5 (with 1 being the worst and 5 being the best).

Ink adhesion—Ink adhesion tests were carried out for dry rub resistance and resistance to damage due to folding or creasing of printed images. Specifically, rub resistance testing was carried out using an abrasion scrub tester. The fabrics were printing with small patches of all available colors (cyan, magenta, yellow, black, green, red, and blue). A weight of 550 g was loaded on the test header. The test tip was made of acrylic resin with crock cloth. The test cycle speed was 25 cm/min and 5 cycles were carried out for each sample at an 8 inch length for each cycle. The test probe can be in dry (dry rub) or wet (wet rub) mode, but for this example, dry rub was tested. The damage on the image was evaluated visually using a scale of 1-5 (with 1 being the worst and 5 being the best).

Additionally, a folding/creasing test was conducted which included first printing a test target sized 8 inches×8 inches, 100% of all colors (i.e., a composite black image). Next, the target was folded several times in both MD and CMD directions with the image size facing inwards, followed by a 1 kg/2.2 lb weight being placed on top of the folded image for 20 minutes. After 20 minutes, the target was unfolded and examined front and back for crease marks. The damage on the image was evaluated visually using a scale of 1-5 (with 1 being the worst and 5 being the best).

Water fastness—Water fastness was evaluated using three techniques: water drip, water immersion, and detergent washing. Regarding the water drip test, this was conducted by applying DI water on printed samples and observing the water damage on the image. The protocol for the water drip test was as follows: First, 3 inch×3 inch squares were printed, one square for each colorant to be tested (100% density), making sure there was 2-3 inches of white/unprinted material around each printed patch. Next, a lab eye-dropper tool was used to dispense 6-7 drops of DI water into the center of each square. This was repeated immediately for each square and then it was allowed to dry on flat table for several hours to one day. After the drying time was complete, the images were examined for permanent halos /circles forming around the printed patches. Hallowing or circles indicated flowing of additive/surface treatment agents in the material which is unfavorable.

Water immersion was carried out by immersing the printed images in water until completely soaked, and allowing the soaked images to dry.

The protocol for the detergent washing test was first to add 2 gallons of tap water (ambient temperature) into 5 gallon bucket, and then add hand washing soap (e.g., Woolite®) using recommended dosage from the soap supplier. The printed fabric sample was soaked for 5 minute, hand squeezed for 1 with medium force, and then soaked for an additional 5 minutes. Next, the soapy water was dumped out and plain tap water was added (2 gallons) and swished for 1 minute. After drying the damage on the image was evaluated visually using a scale of 1-5 (with 1 being the worst and 5 being the best).

Fire retardancy—Fire retardancy was evaluated by Diversified Test Lab Inc, complying with FR Stanford Calif. 1237. The results are summarized using scale of 1-5 (with 1 being the worst and 5 being the best).

Upon conducting these tests, the results were collected and are provided in Table 4 below, as follows:

TABLE 4

Test Results of Treated Fabric and Comparison

A

| Samples | Black OD | Color gamut | Ink bleed | Dry rub | Folding/creasing |
| --- | --- | --- | --- | --- | --- |
| 1 | 1.30 | 248 | 5 | 4 | 4 |
| 2 | 1.27 | 212 | 5 | 5 | 4 |
| 3 | 1.22 | 216 | 5 | 5 | 4 |
| 4 | 1.29 | 220 | 5 | 4 | 4 |
| 5 | 1.27 | 218 | 5 | 3 | 4 |
| 6 | 1.29 | 218 | 5 | 4 | 4 |
| 7 | 1.27 | 226 | 5 | 4 | 4 |
| 8 | 1.28 | 231 | 5 | 5 | 4 |
| 9 | 1.26 | 218 | 5 | 5 | 4 |
| 10 | 1.18 | 203 | 4 | 5 | 5 |
| Comparative | 1.06 | 158 | 3 | 2 | 2 |

B

| Samples | Water drip | Water immersion | Detergent washing | Fire retardancy |
| --- | --- | --- | --- | --- |
| 1 | 5 | 5 | 4 | 5 |
| 2 | 5 | 5 | 4 | 5 |
| 3 | 5 | 3 | 3 | 3 |
| 4 | 5 | 5 | 4 | 5 |
| 5 | 5 | 5 | 3 | 4 |
| 6 | 5 | 5 | 4 | 5 |
| 7 | 5 | 4 | 4 | 5 |
| 8 | 5 | 5 | 4 | 3 |
| 9 | 5 | 5 | 4 | 5 |
| 10 | 5 | 5 | 3 | 4 |
| Comparative | 1 | 1 | 1 | 1 |

As can be seen by the test results above, the surface modified fabric print media provides several advantages over the comparative sample in terms of ink adhesion, image quality, waterfastness, and fire retardancy.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A fabric print medium, comprising a fabric substrate having an ink-receiving coating applied thereto, the coating comprising 10 wt % to 40 wt %, by solids, of a metal complex, 10 wt % to 40 wt %, by solids, of an organophosphate, and 30 wt % to 75 wt %, by solids, of a starch.

2. A fabric print medium as in claim 1, wherein the fabric substrate is woven, knitted, non-woven, or tufted, and the fabric substrate comprises natural or synthetic fibers selected from the group of wool, cotton, silk, rayon, thermoplastic aliphatic polymers, polyesters, polyamides, polyimides, polypropelene, polyethylene, polystyrene, polytetrafluoroethylene, fiberglass, polytrimethylene, polycarbonates, polyester terephthalate, or polybutylene terephthalate.

3. The fabric print medium of claim 1, wherein metal complex comprises a charged complex ion comprising coordinate covalent bonds or dative bonds, and wherein the charged complex ion has from 2 to 9 ligands attached thereto.

4. The fabric print medium of claim 1, wherein the metal complex is a polynuclear complex having at least two charged complex ions, wherein a ligand donates an electron pairs to the at least two charged complex ions and then acts as bridge between the at least two charged complex ions.

5. The fabric print medium of claim 1, wherein the metal complex is an aluminum-based multivalent salt.

6. The fabric print medium of claim 1, wherein the organophosphate has a chemical selected from the group of:

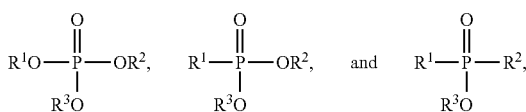

where R1, R2, and R3 are independently C1-C12 branched or straight chained alkyl, aryl, bisphosphate, or halogen.

7. The fabric print medium of claim 1, wherein the organophosphate is selected from the group of tris(1,3-dichloroisopropyl)phosphate, tris(2-chloroisopropyl) phosphate, tris(2-chloroisopropyl)phosphate, dimethyl phosphonate, diethyl phosphonate, dimethyl propyl phosphonate, diethyl N,N-bis(2-hydroxyethyl) aminomethyl phosphonate, oligomeric chloroalkyl phosphates, chloroalkyl phosphates, and aryl phosphates.

8. The fabric print medium of claim 1, wherein the starch is a naturally starch derived from corn starch, potato starch, rice starch, maize starch, cassava starch, or wheat starch.

9. The fabric print medium of claim 1, wherein the starch is a cationic starch that is a reaction product of a quaternary salt and a saccharide.

10. A coating composition, comprising:
water,
10 wt % to 50 wt % metal complex by solid weight content,
10 wt % to 50 wt % organophosphate by solid weight content, and
30 wt % to 80 wt % starch by solid weight content,
wherein the weight ratio of water to solids is from 2:1 to 99:1 by weight.

11. The coating composition of claim 10, wherein the metal complex comprises: i) a charged complex ion having coordinate covalent bonds or dative bonds, and wherein the charged complex ion has from 2 to 9 ligands attached thereto; ii) a polynuclear complex having at least two charged complex ions, wherein a ligand donates an electron pairs to the at least two charged complex ions and then acts as bridge between the at least two charged complex ions; or iii) an aluminum-based multivalent salt.

12. The coating composition of claim 10, wherein the organophosphate has a chemical selected from the group of:

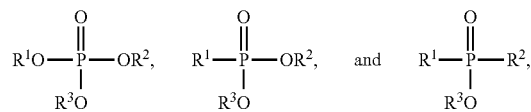

where R1, R2, and R3 are independently C1-C12 branched or straight chained alkyl, aryl, bisphosphate, or halogen.

13. The coating composition of claim 10, wherein the starch comprises: i) a naturally starch derived from corn starch, potato starch, rice starch, maize starch, cassava starch, or wheat starch; or ii) a cationic starch that is a reaction product of a quaternary salt and a saccharide.

14. A method of coating a fabric substrate to form a fabric media substrate, comprising:

impregnating a fabric substrate with a composition comprising water, 10 wt % to 40 wt %, by solids, of a metal complex, 10 wt % to 40 wt %, by solids, of an organophosphate, and 30 wt % to 75 wt %, by solids of a starch; and drying the fabric substrate under heat after padding to form a fabric media substrate.

15. The method of claim 14, comprising the step of applying pressure to the fabric substrate after impregnating the fabric substrate with the composition.

\* \* \* \* \*

UNITED STATES PATENT AND TRADEMARK OFFICE
CERTIFICATE OF CORRECTION

PATENT NO. : 9,193,206 B2  
APPLICATION NO. : 14/397099  
DATED : November 24, 2015  
INVENTOR(S) : Xiaoqi Zhou Page 1 of 1

It is certified that error appears in the above-identified patent and that said Letters Patent is hereby corrected as shown below:

Claims

In column 10, line 32 approx., in Claim 2, delete "polypropelene," and insert -- polypropylene, --, therefor.

In column 10, line 55, in Claim 6, delete "R1, R2, and R3" and insert -- $R^1$, $R^2$, and $R^3$ --, therefor.

In column 10, line 55, in Claim 6, delete "C1-C12" and insert -- $C_1$-$C_{12}$ --, therefor.

In column 12, line 1, in Claim 12, delete "R1, R2, and R3" and insert -- $R^1$, $R^2$, and $R^3$ --, therefor.

In column 12, line 1, in Claim 12, delete "C1-C12" and insert -- $C_1$-$C_{12}$ --, therefor.

In column 12, line 17 approx., in Claim 14, delete "solids" and insert -- solids, --, therefor.

Signed and Sealed this  
Twenty-fourth Day of May, 2016

Michelle K. Lee  
*Director of the United States Patent and Trademark Office*